US010333179B2

United States Patent
Wolff et al.

(10) Patent No.: US 10,333,179 B2
(45) Date of Patent: Jun. 25, 2019

(54) METHOD FOR OPERATING A BATTERY SYSTEM, BATTERY SYSTEM AND MOTOR VEHICLE

(71) Applicants: Robert Bosch GmbH, Stuttgart (DE); Samsung SDI Co., Ltd., Yongin-si, Gyeonggi-do (KR)

(72) Inventors: Hans-Joerg Wolff, Schorndorf (DE); Hans Partes, Asperg (DE); Anne Heubner, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 1606 days.

(21) Appl. No.: 13/890,016

(22) Filed: May 8, 2013

(65) Prior Publication Data
US 2013/0302652 A1 Nov. 14, 2013

(30) Foreign Application Priority Data

May 10, 2012 (DE) ........................ 10 2012 207 806

(51) Int. Cl.
*H01M 10/42* (2006.01)
*H02J 7/34* (2006.01)
*B60L 58/21* (2019.01)
*B60L 58/24* (2019.01)

(52) U.S. Cl.
CPC ......... *H01M 10/4242* (2013.01); *B60L 58/21* (2019.02); *B60L 58/24* (2019.02); *H02J 7/34* (2013.01); *Y02T 10/7005* (2013.01); *Y02T 10/7061* (2013.01)

(58) Field of Classification Search
CPC .. H01M 10/44; H01M 10/441; H01M 10/482; B60L 11/1864; B60L 11/187
See application file for complete search history.

(56) References Cited

U.S. PATENT DOCUMENTS

| 4,101,787 A | 7/1978 | Vail |
| 4,297,590 A | 10/1981 | Vail |
| 4,689,531 A | 8/1987 | Bacon |
| 5,886,503 A * | 3/1999 | McAndrews ...... G01R 31/3658 320/121 |
| 2007/0202370 A1* | 8/2007 | Kuranuki ................ H01M 4/60 320/132 |
| 2012/0013304 A1* | 1/2012 | Murase ............... H01M 10/482 320/116 |

FOREIGN PATENT DOCUMENTS

| CN | 1782729 A | 6/2006 |
| CN | 1934745 A | 3/2007 |
| CN | 101013822 A | 8/2007 |
| CN | 101141016 A | 3/2008 |
| CN | 10116792 A | 4/2008 |

(Continued)

*Primary Examiner* — Jimmy Vo
(74) *Attorney, Agent, or Firm* — Maginot, Moore & Beck LLP

(57) ABSTRACT

The disclosure describes a method for operating a battery system having at least a first battery module and a second battery module. The method includes activating the first battery module for a defined clock time, then activating the second battery module for the defined clock time, and at the same time deactivating the first battery module.

9 Claims, 3 Drawing Sheets

(56) References Cited

FOREIGN PATENT DOCUMENTS

| CN | 101162792 | A | 4/2008 | |
|---|---|---|---|---|
| CN | 103368226 | A | 10/2013 | |
| DE | 10 2009 000 337 | A1 | 7/2010 | |
| DE | 10 2010 041 014 | A1 | 3/2012 | |
| DE | 10 2010 041 029 | A1 | 3/2012 | |
| JP | WO 2010109881 | A1 * | 9/2010 | .......... B60L 11/1864 |
| KR | 100805116 | B1 | 2/2008 | |

* cited by examiner

METHOD FOR OPERATING A BATTERY SYSTEM, BATTERY SYSTEM AND MOTOR VEHICLE

This application claims priority under 35 U.S.C. § 119 to patent application no. DE 10 2012 207 806.1, filed on May 10, 2012 in Germany, the disclosure of which is incorporated herein by reference in its entirety.

BACKGROUND

The present disclosure relates to a method for operating a battery system, to a battery system which can be operated in accordance with the method, and to a motor vehicle having the battery system.

Battery systems for use in motor vehicles, also called traction batteries, constitute, as is known, an interconnection of a plurality of individual battery cells or battery modules which comprise battery cells. Battery systems of this kind have a comparatively high battery capacity in comparison to consumer batteries. In order to be able to deliver a sufficient amount of power in every drive state of the motor vehicle, for example during start-up, battery systems of this kind are designed to be resistant to high currents. The rated voltage of the battery system is defined by series interconnection of battery cells or battery modules, and parallel connection of battery cells or battery modules is frequently additionally employed in order to increase the battery system capacity.

Conventional batteries have an inherent internal resistance. A voltage loss which reduces the voltage which is output by the battery is dropped across the internal resistance. If current is drawn from a battery, that is to say the battery is subjected to loading, the internal resistance of said battery changes dynamically in the meantime. If, for example, a lithium-ion battery is discharged with a current, for example 1 C at a battery capacity of 60 Ah, the profile for the output voltage of the lithium-ion battery which is shown in FIG. 1 is established. After a current jump, the voltage initially runs at a constant plateau and then drops since the internal resistance increases in the meantime.

DE 10 2010 041 014 also discloses a method for operating a battery system. The battery system has a battery which, for its part, has a battery module line with a plurality of battery modules which are connected in series. Each battery module comprises a coupling unit which is designed to decouple the battery module from the battery module line, to bridge the battery module or to connect the battery module to the other battery modules in series, so that a voltage across the battery module line can be variably adjusted, that is to say can be increased or lowered.

SUMMARY

The disclosure provides a method for operating a battery system having at least a first battery module and a second battery module. The method comprises at least the following steps:
  activating the first battery module for a defined clock time;
  then activating the second battery module for the defined clock time and at the same time deactivating the first battery module.

The disclosure further provides a battery system having at least a first battery module and a second battery module and a control unit, wherein the control unit is designed to carry out the method according to the disclosure.

The disclosure also provides a motor vehicle which comprises the battery system, wherein the battery system is connected to a drive system of the motor vehicle.

The method according to the disclosure can prevent the creation of high internal resistances in the battery modules. When a battery cell or a battery module which comprises a battery cell is discharged, a high internal resistance of this kind can be created in the battery module in particular by a large amount of current being drawn. In particular, a depletion effect can occur in the battery module in the event of discharge at high currents. This effect causes a drop in the voltage provided by the battery module. The effect is intensified, in particular, at a low state of charge, at a low temperature and at a high long-lasting current loading of the battery module. Furthermore, the effect can accelerate the aging of a battery module.

The method according to the disclosure can reduce the creation of a high internal resistance and, in particular, the occurrence of a depletion effect by, in particular, activating the first battery module only for the defined clock time and then, after the clock time has elapsed, activating the second battery module instead of the first battery module. The first battery module is, in particular, deactivated as soon as the second battery module is activated, as a result of which the total voltage of the battery system does not substantially change but the currently unused or deactivated battery module can recover, that is to say it can reduce the state of depletion by chemical compensation processes and it can reduce its internal resistance. If the unused battery module is reactivated after a specific recovery time, its internal resistance is lower. A lower voltage drop and power loss are created in the battery module at a low internal resistance. The method according to the disclosure can further increase the efficiency of the battery system, compensate for non-uniform loading or aging of battery modules, avoid depletion effects due to permanent operation of a battery module and improve the service life of the battery system by virtue of more uniform loading of the battery modules.

The method according to the disclosure regenerates, in particular, the deactivated first battery module. The first battery module is preferably deactivated for a prespecified recovery time during which chemical compensation processes reduce the internal resistance of the battery module and thus compensate for any existing state of depletion of the battery module.

In a preferred refinement, the method can further comprise at least one of the following steps:
  detecting the temperature of one of the battery modules
  detecting the state of charge of one of the battery modules
  detecting the voltage of one of the battery modules.

To this end, the battery modules of the battery system comprise, in particular, a temperature sensor, a voltage-measuring unit and/or a control unit, wherein the control unit is preferably designed such that it can determine the state of charge of the battery module, for example, from the detected voltage.

Furthermore, the method comprises, in particular, the step of:
  defining the clock time as a function of at least one of the detected values from amongst temperature, state of charge and voltage. In particular, the clock time is shorter when the temperature falls. In the same way, the clock time is longer when the temperature increases. The clock time is further shortened when the state of charge is lower. In the same way, the clock time is extended when the state of charge increases. In English, the state of charge is abbreviated to SOC.

When a state of depletion occurs in one of the battery modules when a large amount of current is drawn, a voltage profile which has a point of inflection is generally formed on the battery module. This point of inflection can further be determined by detecting the voltage of the battery module. If the first activated battery module reaches this point of inflection of the voltage, the clock time can be defined such that the activated battery module is deactivated and, at the same time, the second battery module is activated instead when the point of inflection of the voltage is reached.

The control unit of the battery system is preferably designed such that it can activate and deactivate the battery cells. The battery modules preferably comprise a coupling unit having controllable switching elements. These switching elements can be actuated by the control unit, in particular, in such a way that the battery module provides a battery module voltage, that is to say is activated, or that the battery module provides a voltage of zero volts, wherein the battery module is bridged in this case, that is to say is deactivated.

The battery system can be connected to a pulse-controlled inverter, which inverts a DC voltage which is supplied by the battery modules, via a DC voltage intermediate circuit. As an alternative, the battery system can be in the form of a battery direct inverter, wherein a plurality of battery modules, connected in series, form a battery module line and the battery system comprises a plurality of the battery module lines. In this case, the battery modules of a battery module line can preferably be actuated in such a way that they directly generate an alternating voltage and feed a load with said voltage. The plurality of battery module lines form, in particular, a polyphase system.

The battery modules preferably comprise lithium-ion battery cells; therefore, the battery system is, in particular, a lithium-ion battery system.

BRIEF DESCRIPTION OF THE DRAWINGS

Exemplary embodiments of the disclosure will be explained in greater detail with reference to the following description and the drawings, in which.

DETAILED DESCRIPTION

Figure 1:
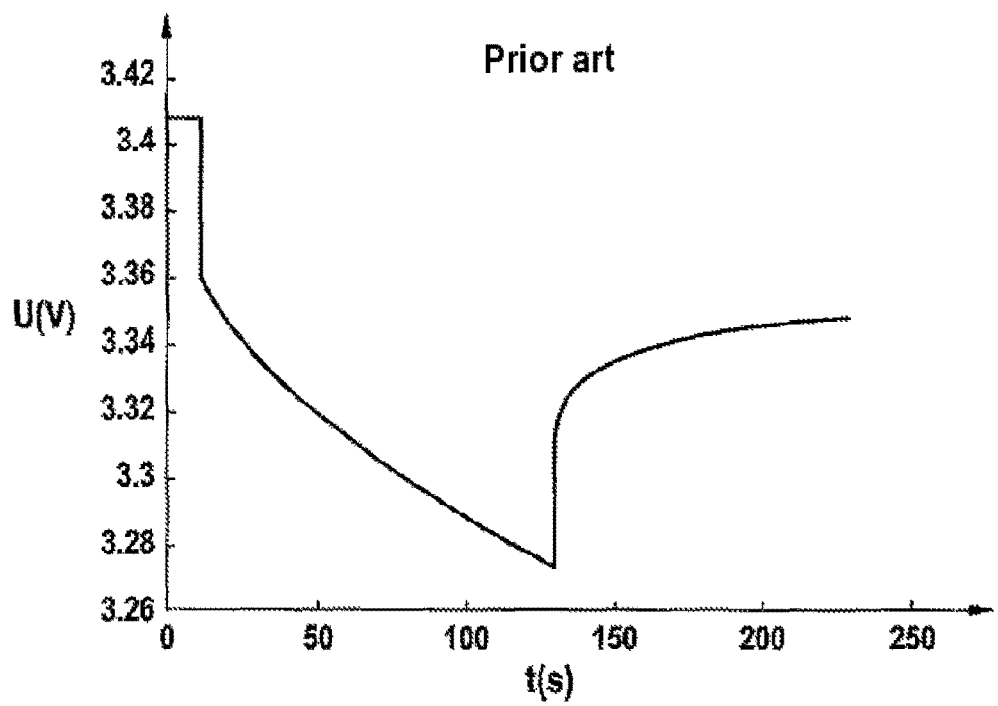
FIG. 1 shows a graph of a known voltage profile of a battery module.
Figure 2:
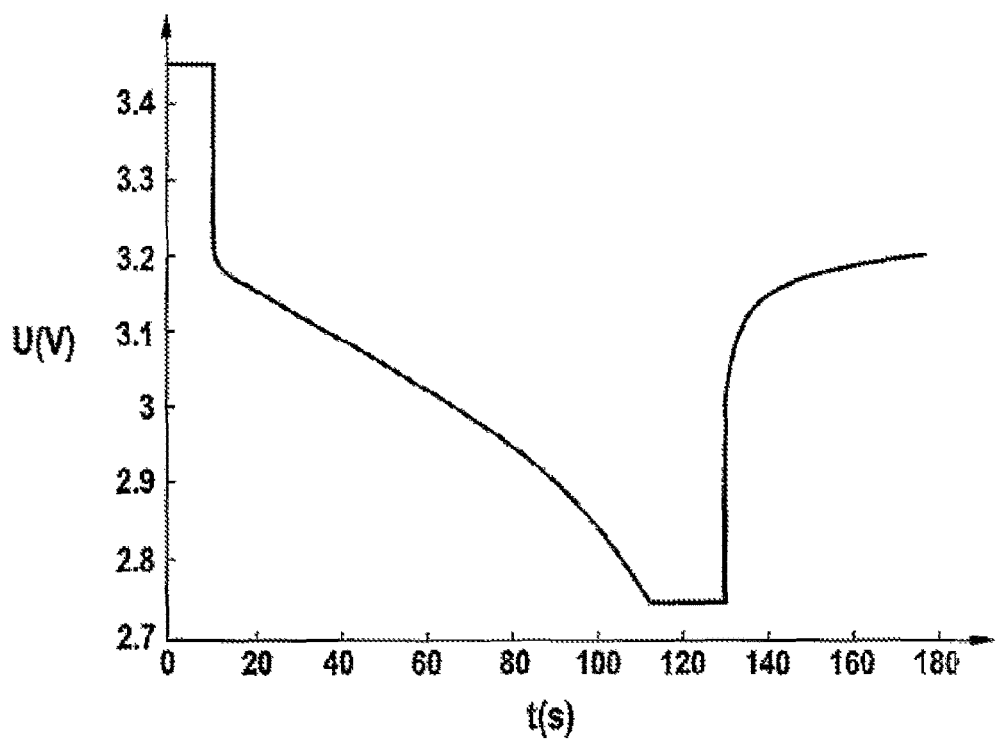
FIG. 2 shows a graph of a voltage profile of a battery module of a battery system according to the disclosure.

FIG. 2 shows a graph of a voltage profile of a first battery module 306. A time axis with seconds values forms the abscissa of the graph. The ordinate of the graph indicates values of the voltage profile or of the battery module voltage in volts. A high current is drawn from the battery module 306 starting from time 0 seconds. The battery module voltage drops on account of the large amount of current drawn.

The battery module comprises at least one lithium-ion battery cell. A depletion of ions on the molecule surface of an electrode of the lithium-ion battery cell occurs in this at least one battery cell on account of the large amount of current drawn. This chemical process, also called the depletion effect, delays a release of ions from the electrode, and an internal resistance of the at least one lithium-ion battery cell increases. Therefore, the voltage of the battery module drops in such a way that the voltage profile exhibits a point of inflection, as can be seen in FIG. 2 approximately at 70 seconds and 2.95 volts.

Figure 3:
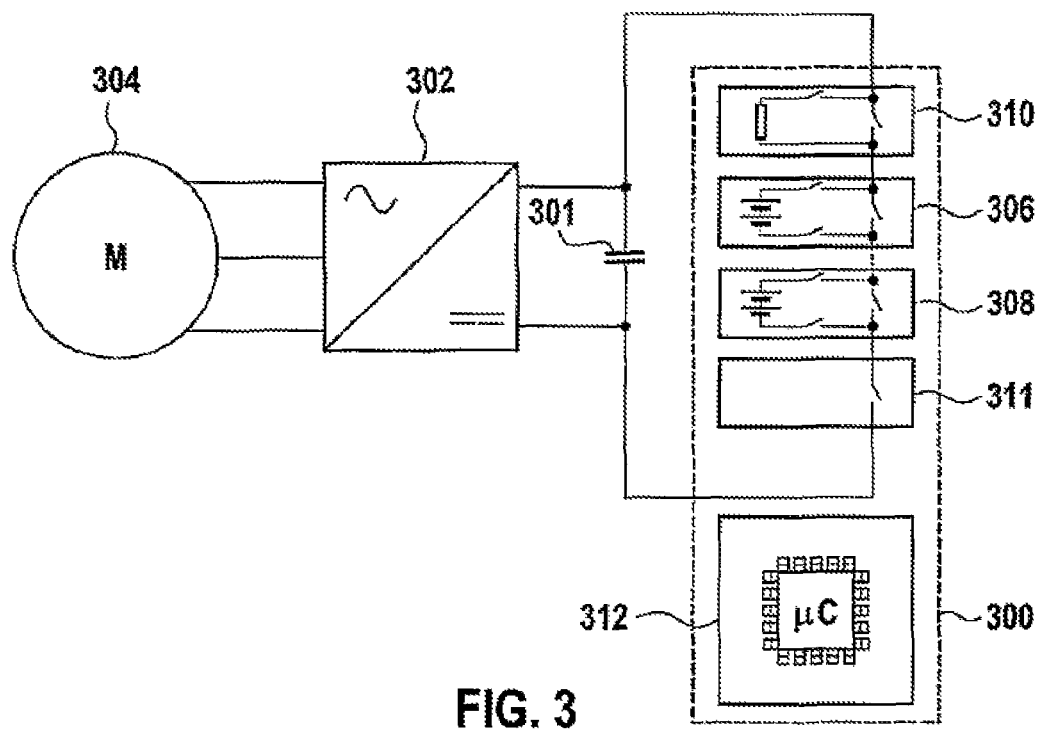
FIG. 3 shows a battery system according to an exemplary embodiment of the disclosure.

FIG. 3 shows a battery system 300 according to an exemplary embodiment of the disclosure. The battery system 300 is connected to a pulse-controlled inverter 302 via a capacitor 301 which forms a DC voltage intermediate circuit. The pulse-controlled inverter 302 inverts a DC voltage which is generated by the battery system 300 into a three-phase AC voltage. The AC voltage feeds an electric motor 304 which is connected to the pulse-controlled inverter 302. The battery system 300 comprises a plurality of battery modules, of which, by way of example, a first battery module 306 and a second battery module 308 are shown in FIG. 3. The battery modules 306, 308 form a series circuit. Charging disconnection elements 310, 311 are arranged at the ends of the series circuit, said charge disconnection elements being able to disconnect the series circuit of the battery module 306, 308 from a load or from the capacitor 301 and the pulse-controlled inverter 302 as required. The charging disconnection elements 310, 311 can also connect the battery modules 306, 308 in series with a series charging resistor in order to limit, for example, high charging currents. The battery system 300 also comprises a control unit 312.

In addition to the at least one lithium-ion battery cell, the battery modules 306, 308 each comprise a controllable coupling unit which is connected to the at least one lithium-ion battery cell. The coupling unit comprises controllable switching elements which are actuated by the control unit in such a way that a battery module provides its battery module voltage or provides a voltage of zero volts, wherein the battery module is bridged in this case.

The control unit 312 is further designed such that it activates the first battery module 306 by means of the coupling unit for a defined clock time $T_t$ and, after the clock time $T_t$ has elapsed, activates the second battery module 308 by means of the coupling unit for a further clock time $T_t$, wherein the control unit 312 deactivates the first battery module 306 by means of the coupling unit at the same time as the second battery module 308 is activated. In a similar way, a third battery module can be activated after the further clock time $T_t$ has elapsed, wherein the second battery module 308 is deactivated at the same time, and so on. In a similar manner, a first group of battery modules can also be activated for the clock time $T_t$ and then a second group of battery modules can be activated for the clock time $T_t$, wherein the first group of battery modules is deactivated at the same time.

While the first battery module 306 is deactivated, it can regenerate, it can counteract the depletion effect, in particular, by chemical compensation processes and, as a result, lower its internal resistance.

The control unit 312 is also designed to detect various measurement values. The measurement values include: the temperature of the battery system 300, the temperature of the individual battery modules 306, 308, the voltage of the individual battery modules 306, 308, that is to say the battery module voltages and the state of charge of the individual battery modules 306, 308. The control unit 312 dynamically defines the clock time $T_t$ as a function of these measurement values. The clock time $T_t$ is shortened, for example, when the state of charge is lower. In the same way, the clock time $T_t$ is extended when the state of charge increases.

The point of inflection of the voltage profile, as shown in FIG. 2, is determined by the battery module voltages being detected by the control unit 312. If the first activated battery module 306 reaches this point of inflection of the voltage, the clock time $T_t$ can be defined such that the second battery module 308 is activated when the point of inflection of the voltage is reached and the first battery module 306 is deactivated at the same time.

Figure 4:
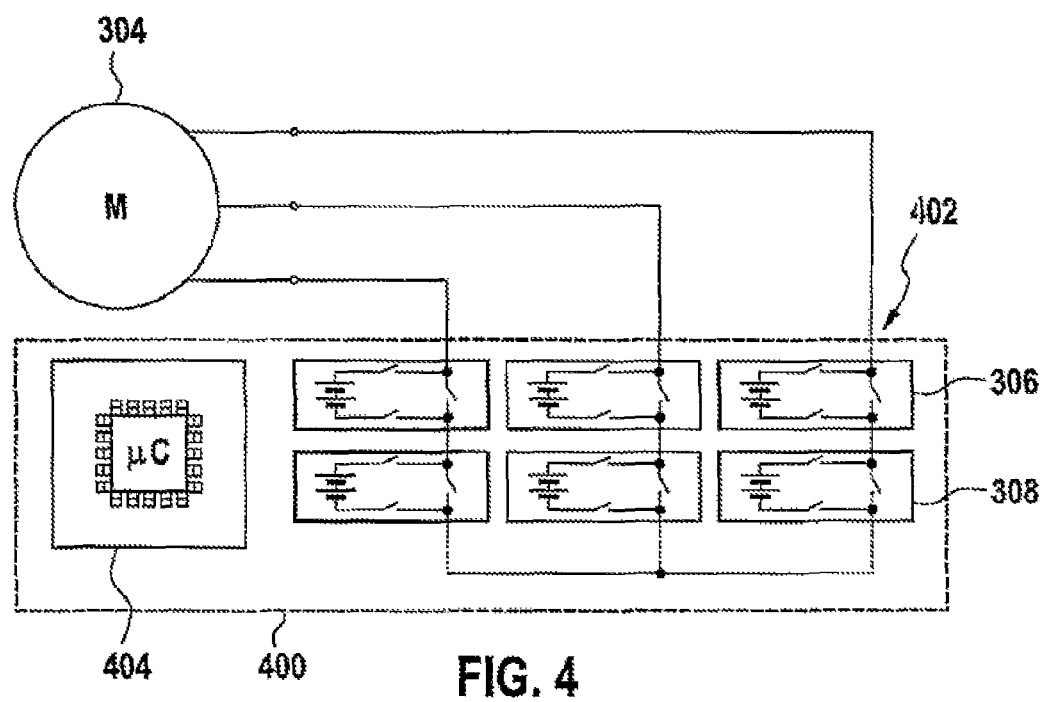
FIG. 4 shows a further battery system according to an exemplary embodiment of the disclosure.

FIG. 4 shows a battery system 400. In contrast to the battery system 300, the battery system 400 can be connected directly to the electric motor 304. Said battery system comprises three battery module lines 402 which each form a phase. The battery module lines 402 each have a plurality of battery modules, of which, by way of example, the first battery module 306 and the second battery module 308 are shown in FIG. 4 in each case. The battery system 400 also has a control unit 404. The control unit 404 actuates the coupling units of the battery modules 306, 308 in such a way that the battery module lines 402 provide AC voltages. The three battery module lines 402 form a three-phase system in this case.

The control unit 404 further comprises the same functions as the control unit 312. In particular, the control unit 404 activates the first battery module 306 of a battery module line 402 for the clock time $T_t$ and then activates the second battery module 308 for the clock time $T_t$ and, at the same time, deactivates the first battery modules 306. The control unit 404 controls the battery modules 306, 308 in an intelligent manner such that the moment voltage provided by the battery module line 402 remains constant. The battery system 400 therefore also allows regeneration of battery modules while AC voltage is provided.

Figure 5:
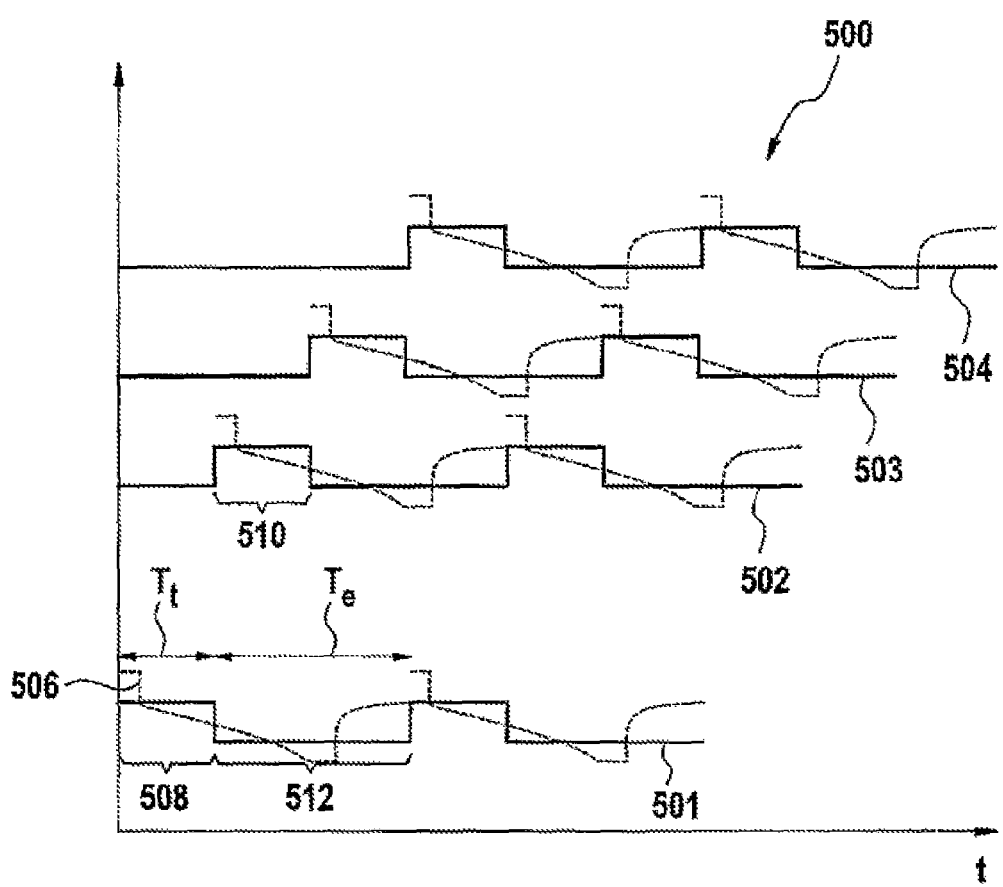
FIG. 5 shows a graph for illustrating an exemplary embodiment of the method according to the disclosure.

FIG. 5 shows a graph 500 for illustrating an exemplary embodiment of the method according to the disclosure. A time axis forms the abscissa of the graph 500. The ordinate of the graph 500 shows activation states 501, 502, 503, 504 of four battery modules and voltage values of four battery module voltages 506. The profile of the battery module voltage 506 is formed by a large amount of current being drawn from a battery module and corresponds to the voltage profile which is shown in FIG. 2. The control unit 312; 404 can actuate the first battery module 306 in such a way that the activation states 501 are present and it can actuate the second battery voltage 308 in such a way that the activation states 502 are present. In a similar way, the control units 312; 404 can actuate further battery modules, so that the further activation states 503, 504 are present. A method, which is carried out by the control unit 312; 404, for operating the battery system 300; 400 having at least the first battery module 306 and the second battery module 308 exhibits the following steps.

In a first method step 508, the control unit 312; 404 activates the first battery module 306 for the clock time $T_t$. The clock time $T_t$ was defined at the point of inflection of the battery module voltage 506 by the control unit 312; 404. Then, that is to say, in particular, after the clock time $T_t$ has elapsed, the control unit 312; 404 activates the second battery module 308 for the defined clock time $T_t$ in a second method step 510. In a third method step 512, the control unit 312; 404 deactivates the first battery module 306 at the same time.

In this case, the control unit 312; 404 deactivates the first battery module 306 for a recovery time $T_e$. The recovery time $T_e$ permits chemical compensation processes which lower the internal resistance of the first battery module 306.

The battery system 300; 400 having the first battery module 306, the second battery module 308 and the control unit 312, 404 which carries out the method can be used, in particular, in motor vehicles. Motor vehicles of this kind can comprise the electric motor 304 which forms a drive system. In this case, the method according to the disclosure increases the range of the motor vehicle and improves the reliability since non-uniform loading and aging of the battery modules are reduced.

What is claimed is:

1. A method for operating a battery system to provide power to a load, the battery system including at least a first battery module and a second battery module, the first battery module and the second battery module each being configured to provided power to the load only while activated, the method comprising:
   activating the first battery module to provide power to the load;
   deactivating the first battery module at a defined time period after the activating of the first battery module;
   activating the second battery module to provide power to the load, the activating of the second battery module being simultaneous with the deactivating of the first battery module.
   deactivating the second battery module at the defined time period after the activating of the second battery module.

2. The method according to claim 1, further comprising:
   detecting a temperature of one of the first battery module and the second battery module.

3. The method according to claim 2, further comprising:
   detecting a state of charge of one of the first battery module and the second battery module.

4. The method according to claim 3, further comprising:
   detecting a voltage of one of the first battery module and the second battery module.

5. The method according to claim 4, further comprising:
   defining the defined time period based on at least one of the detected temperature, the detected state of charge, and the detected voltage.

6. The method according to claim 5, further comprising:
   detecting an inflection point in the detected voltage; and
   defining the defined time period such that it ends at a point in time coinciding with the detected inflection point.

7. A battery system for providing power to a load, the battery system comprising:
   a first battery module, the first battery module being configured to provided power to the load only while activated;
   a second battery module, the second battery module being configured to provided power to the load only while activated; and
   a control unit operably connected to the first battery module and the second battery module, the control unit being configured to (i) activate the first battery module to provide power to the load, (ii) deactivate the first battery module at a defined time period after the activating of the first battery module (iii) activate the second battery module to provide power to the load, the activating of the second battery module being simultaneous with the deactivating of the first battery module, and (iv) deactivate the second battery module at the defined time period after the activating of the second battery module.

8. The battery system according to claim 7, wherein:
   the first battery module includes a first coupling unit configured to activate the first battery module and to deactivate the first battery module, and
   the second battery module includes a second coupling unit configured to activate the first battery module and to deactivate the second battery module.

9. A motor vehicle comprising:

a drive system; and a battery system connected to the drive system and including (i) a first battery module, the first battery module being configured to provided power to the drive system only while activated, (ii) a second battery module, the second battery module being configured to provided power to the drive system only while activated, and (iii) a control unit operably connected to the first battery module and the second battery module, wherein the control unit is configured to (i) activate the first battery module to provide power to the drive system, (ii) deactivate the first battery module at a defined time period after the activating of the first battery module (iii) activate the second battery module to provide power to the drive system, the activating of the second battery module being simultaneous with the deactivating of the first battery module, and (iv) deactivate the second battery module at the defined time period after the activating of the second battery module.

\* \* \* \* \*

UNITED STATES PATENT AND TRADEMARK OFFICE
CERTIFICATE OF CORRECTION

PATENT NO. : 10,333,179 B2
APPLICATION NO. : 13/890016
DATED : June 25, 2019
INVENTOR(S) : Wolff et al.

Page 1 of 1

It is certified that error appears in the above-identified patent and that said Letters Patent is hereby corrected as shown below:

In the Claims

Claim 1, Line 20, "module." should read --module; and--.

Signed and Sealed this
First Day of October, 2019

Andrei Iancu
*Director of the United States Patent and Trademark Office*